Oct. 14, 1952  A. F. DONOVAN ET AL  2,613,751
HELICOPTER CONTROL
Filed Feb. 4, 1947  4 Sheets-Sheet 1
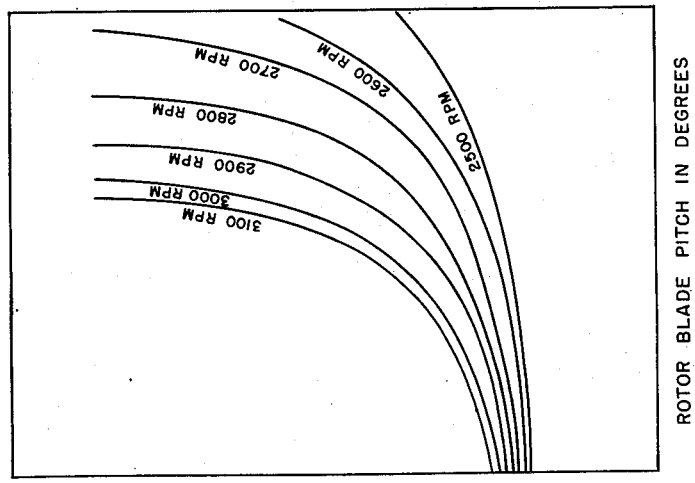
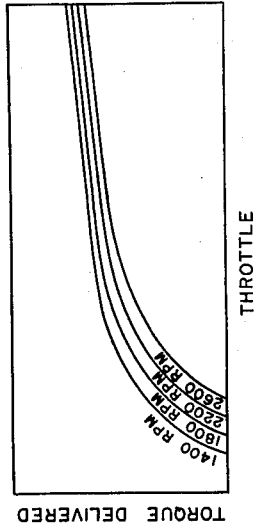
INVENTOR.
ALLEN F. DONOVAN
BY HAROLD HIRSCH
Richard W. Treverton
ATTORNEY

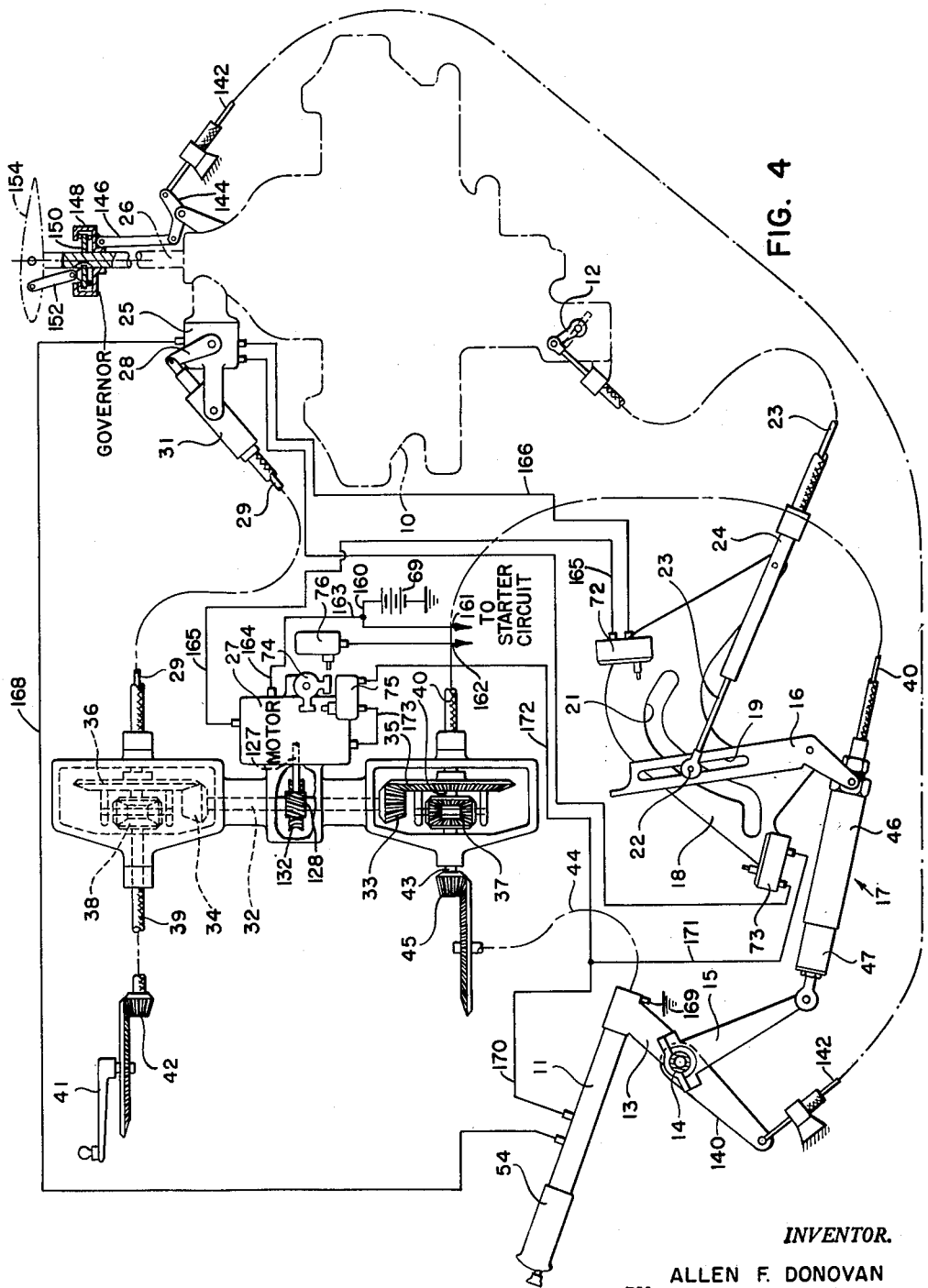

Oct. 14, 1952 A. F. DONOVAN ET AL 2,613,751
HELICOPTER CONTROL
Filed Feb. 4, 1947 4 Sheets-Sheet 3
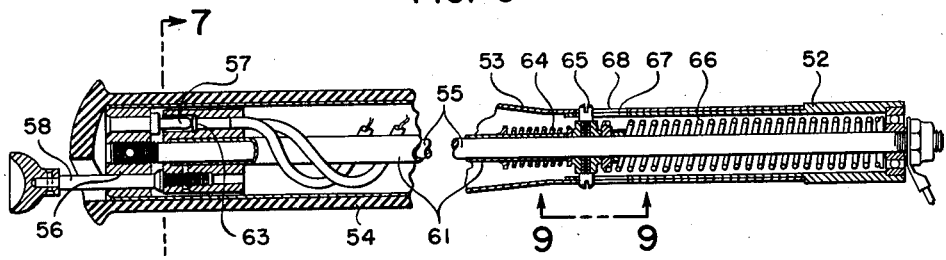
FIG. 6
FIG. 7  FIG. 8  FIG. 9
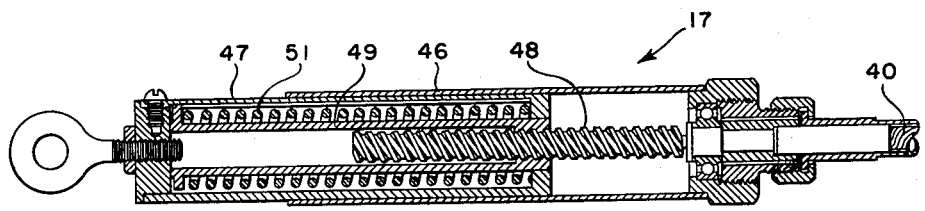
FIG. 5
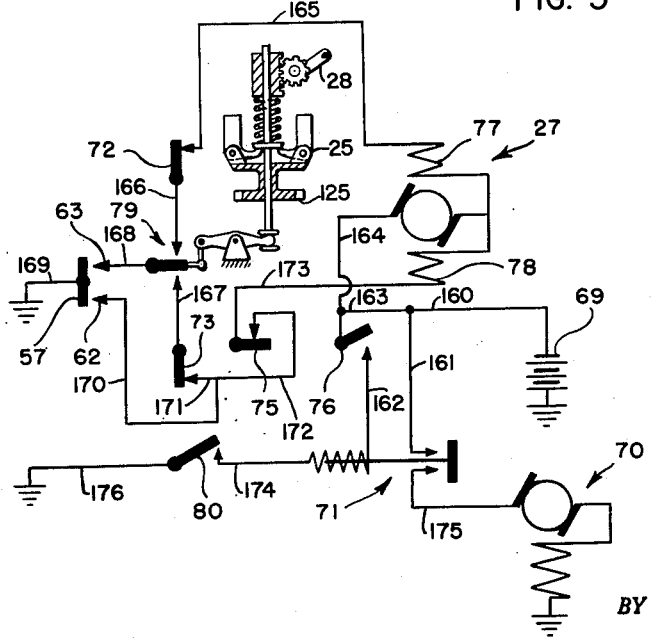
FIG. 10
*INVENTOR.*
ALLEN F. DONOVAN
BY HAROLD HIRSCH
*Richard W. Treverton*
ATTORNEY Oct. 14, 1952 A. F. DONOVAN ET AL 2,613,751
HELICOPTER CONTROL
Filed Feb. 4, 1947 4 Sheets-Sheet 4

INVENTOR.
ALLEN F. DONOVAN
BY HAROLD HIRSCH
Richard W. Treverton
ATTORNEY

Patented Oct. 14, 1952

2,613,751

UNITED STATES PATENT OFFICE 2,613,751

HELICOPTER CONTROL

Allen F. Donovan, Kenmore, and Harold Hirsch, Buffalo, N. Y., assignors to Curtiss-Wright Corporation, a corporation of Delaware Application February 4, 1947, Serial No. 726,260

15 Claims. (Cl. 170—135.74)

1

The present invention relates to helicopter controls and particularly to means for coordinating the power control means with the means for changing the mean pitch of the lifting rotor blades.

The invention contemplates a linkage connecting the rotor blade pitch change means with the engine throttle valve control, or other power control, so that the rotor drive power will be increased or decreased in accordance with increases or decreases in blade pitch. The linkage is so arranged that the power variation it provides will approximately compensate for change in drag of the blades incident to pitch change.

Superimposed upon this control of power in accordance with pitch changes is a control by a device responsive to engine or rotor speed. This device, or governor, controls the operation of means which adjust the linkage to change the pitch versus power relationship provided by the linkage. By this system coarse adjustments of the power control result directly from pitch changes, and finer adjustments of the power control are produced by the governor means. The system has as advantages that large adjustments of the power control, needed by reason of large magnitude changes in pitch, are made simultaneously with the pitch changes, and the usual, undesirable effects of a governor, namely lag in response and hunting, are minimized.

The governor means is preferably capable of being adjusted to different control speeds, so that the automatically maintained rotor speed may be changed at will to any selected value within the operating range of the equipment. The relationship of pitch versus power required to maintain constant rotor speed is, of course, different for different rotor speeds. That is, for one rotor speed in a given condition of flight, say hovering or vertical ascent or descent, the required power setting, as represented by throttle position, when plotted against pitch will result in a distinctive curve; and there will be a different such curve for each different rotor speed.

For this reason the present invention contemplates a pitch-power control linkage such that adjustments of it will change its kinematics to cause it to respond as nearly as practicable to the various pitch versus power curves of the various rotor speeds within the operating range. In this way the linkage may be adjusted to produce the proper coarse movements of the power control, for pitch changes, at any selected rotor speed. Moreover, such adjustment of the linkage may be effected by the governor means incidentally to its action of superimposing a speed responsive control upon the system.

The invention further contemplates means for controlling the power independently of the automatic or governor control whenever desired. This independent control may, if desired, be accomplished through the same linkage that is employed for the automatic control. In such case it is desirable that means be provided to act, upon the changeover from automatic to manual control, to return the linkage from whatever position of adjustment the governor has moved it, to a predetermined position suited for manual operation.

Still further the invention contemplates means to stabilize the action of the governor or to minimize its tendency to hunt a neutral speed by alternately causing underspeed and overspeed conditions. This stabilizing action may be effected by changing the control speed of the governor in proportion to the change of linkage adjustment made by the governor. In this action, known as "feedback," the speed setting of the governor is decreased as the governor controlled means act to increase speed, and the governor speed setting is increased as the controlled means act to decrease speed. The feedback contemplated in the present invention may be effected, if desired, through the same connections to the governor by which the latter's speed setting is manually adjusted.

The foregoing and other objects and advantages of the invention, and of the various combinations and sub-combinations thereof, will become apparent from the following description of typical embodiments, wherein:

Figure 1 is a graph illustrating rotor torque variation with change of rotor blade pitch at different rotor speeds;

Figure 2 is another graph illustrating the variation in engine torque delivered for change in throttle position at different engine speeds, for a typical helicopter power plant;

Figure 3 is still another graph in effect combining the graphs of Figures 1 and 2, showing for variation in rotor blade pitch the change in throttle position necessary to maintain different engine speeds;

Figure 4 is a diagrammatic view illustrating the functional relationship of the several elements of the system in one embodiment of the invention;

Figure 5 is a longitudinal sectional view through a resilient screw jack device comprising a part of the linkage shown in Figure 4;

Figure 6 is a longitudinal sectional view through the pitch change lever shown in Figure 4;

Figure 7 is a sectional view taken along line 7—7 of Figure 6;

Figure 8 is a fragmentary sectional view taken along line 8—8 of Figure 7;

Figure 9 is a fragmentary elevational view of a portion of the pitch change lever as indicated by line 9—9 of Figure 6;

Figure 10 is a wiring diagram for apparatus shown in Figure 4;

Figure 11:
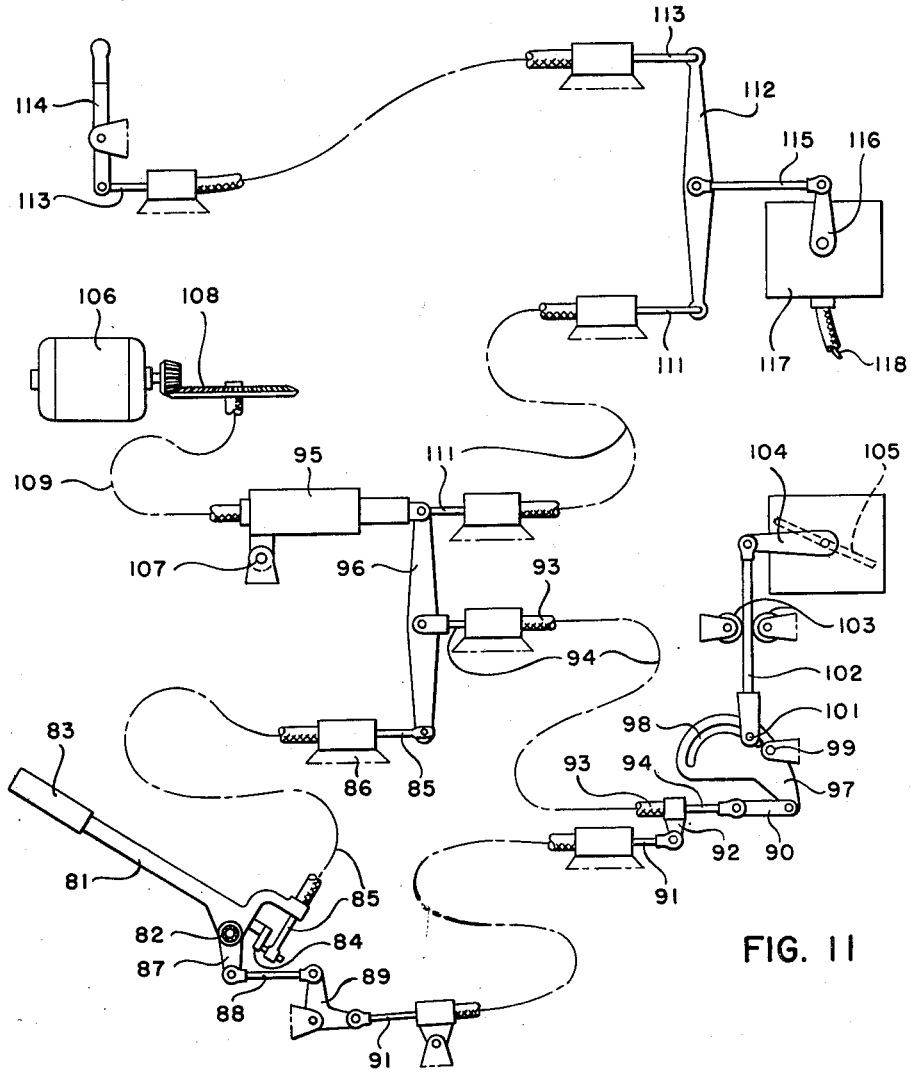
Figure 11 is a view similar to Figure 4 but illustrating a modified system; and, Figure 12 is an elevational view of a linkage adapted to replace a portion of the apparatus shown in Figure 11 as a further modification of the invention.

The torque requirements of a helicopter rotor increase above an initial value substantially parabolically with rotor pitch, the characteristics of the torque versus pitch relationship for several different rotor speeds being shown in Figure 1. A family of curves for different engine speeds showing the relationship between throttle opening and torque delivered is shown in Figure 2. By combining two such series of curves there could be obtained a third series of curves showing the rotor pitch versus engine throttle opening relationship necessary to maintain different rotor or engine speeds. These curves would in general resemble the curves shown in Figure 3 which were obtained experimentally from an actual helicopter by tying it down and under conditions of negligible wind measuring the throttle position required at various rotor pitch values to maintain engine speeds of the values indicated. Rotor blade pitch was measured in degrees while throttle movement was measured in terms of linear displacement of a flexible sliding wire connected to the crank of the engine throttle.

In Figure 4 is illustrated a system embodying the present invention. The system employs a mechanical linkage between a pitch change lever 11 and a throttle arm 12 by which the air intake and hence the power of the helicopter engine 10 is controlled substantially in accordance with pitch versus power relationships shown in Figure 3. The pitch lever 11 is connected by fitting 13 to a rock shaft 14 to which is pinned the arm 140 in turn connected by sliding wire 142 to one arm of a bell crank 144. The other arm of the bell crank is connected by a link 146 to a non-rotating collar 148 which is free to slide on the lift rotor drive shaft 26 and acts through antifriction thrust bearings on the pitch adjusting collar 150, which is keyed to the shaft 26, but is free to slide along the shaft. Links 152 connect the adjusting collar 150 to each rotor blade at a point spaced from the blade axis (one such link and one blade being shown in the drawing) so that sliding of the adjusting collar along the shaft results in change of the blade pitch. The pitch control linkage is arranged in such manner that upon upward movement of the hand grip of the lever the mean pitch of the blades will be increased. An arm 15 on the rock shaft is pivotally connected to the lower arm of a bell-crank lever 16 by an adjustable length link 17 whose details are shown in Figure 5. The bell-crank lever is fulcrumed upon a fixed plate 18 and has in its upper arm a slot 19. Plate 18 also has a slot, designated 21. A roller on a pin 22 attached to one end of a flexible sliding wire 23 extends through and defines the point of intersection of the two slots.

The flexible casing of the sliding wire 23 terminates at the end thereof adjacent roller 22 in a guide tube 24 which is pivoted to plate 18, and at its opposite end is anchored to the engine 10 while the cable 23 is connected to the throttle arm 12.

It will be seen that as the pitch lever is elevated or lowered to respectively increase or decrease the pitch of the rotor blades, the linkage described will function to open or close the throttle. In such action levers 15 and 16 will move clockwise and throttle lever 12 clockwise for throttle opening movement. The degree to which the throttle is opened for a given angular movement of the rock shaft 14 depends upon the kinematics of the linkage system, which may be varied to produce the desired pitch versus throttle relationships by changing the angular relationship of the several lever arms and also by changing the contour of the cam slot 21. The latter acts, as bell-crank lever 16 moves about its fulcrum, to move the roller on pin 22 inwardly or outwardly along the slot 19 thereby varying the effective length of the upper arm of the lever 16.

The kinematics of the linkage shown are such that by extension or contraction of link 17 the pitch versus throttle relationship provided by the linkage will change from approximate adherence to the curve for one speed to similarly approximate adherence to the curve for another speed (see the family of such curves, Figure 3). Thus extension of the link 17 will not only partially close the throttle but will also change the angular relationship between levers 15 and 16 in a direction such that the linkage will approximately maintain a pitch versus throttle relationship suitable for a slower rotor speed. Likewise contraction of the link 17 will not only further open the throttle but will also change the relationhip between levers 15 and 16 in a direction to roughly maintain a pitch-throttle relationship necessary for a faster rotor speed.

It is desirable that the approximate relationships between pitch and throttle be as accurate as possible in the speed ranges normal for flight and especially for pitch settings and throttle openings near those required for hovering flight, these being more important than for other speeds and flight conditions. It will be understood, of course, that only approximately correct throttle positions will be produced by the linkage thus far described in detail, since, for one thing, such variables as engine efficiency, air density, loading condition, forward speed of the helicopter, etc. affect the finer throttle adjustment required to maintain within reasonably close limits a given rotor speed for a given blade pitch angle. The means for effecting such fine adjustment by extension and contraction of the link 17 will now be described.

A speed responsive governor 25, of any suitable type such as that shown schematically in Figure 10, is arranged to be driven from the engine shaft, or, possibly, from the lift rotor shaft 26, as through gear 125. Through suitable means, such as the electrical circuit arrangement to be later described, switches operated by the governor serve to control the operation of a linkage-adjusting electric motor 27. The effect of the governor is to cause the motor to expand link 17 (reducing the throttle opening) if the drive speed exceeds by a certain margin the governor control speed setting or, if the drive speed is under the set speed by a similar margin, to cause reverse operation of the motor to contract link 17 and so open the throttle. The speed setting of the governor is adjusted by angular movement of arm 28, which may be effected by turning a flexible shaft 29 to expand or contract a screw jack 31 that is connected to the arm.

The motor 27, through a worm 128 fast on the motor shaft 127 and driving a worm wheel 132 keyed to a shaft 32, or through any other suitable reduction gearing, drives the shaft 32 which carries pinions 33 and 34 which respectively mesh with ring gears 35 and 36 of differential gear units 37 and 38. One of the sun gears of unit 38 is secured to flexible shaft 29, while the other sun gear of the unit is attached to another flexible shaft 39. The latter may be turned by a hand crank 41 through speed increasing gearing 42. It will be seen that when the motor shaft 32 and ring gear 36 are stationary, turning of the crank 41 will be effective through the differential unit 38 to turn shaft 29 and thereby adjust the speed setting of the governor. Or, if the handle 41 is held stationary as it usually is by suitable friction means (not shown) when it is not being manually operated, rotation of the ring gear by the motor will also turn the shaft 29 to adjust the governor speed setting for a purpose to be more fully explained hereinafter.

One sun gear of the differential unit 37 is secured to a shaft 43 which is rotated through a flexible shaft 44 and speed increasing gearing 45 by manual turning of a throttle operating grip 54 on the pitch lever 11. The grip may be so operated only when the governor control is turned off and is locked against turning when the governor control is turned on. The other sun gear of the unit 37 is secured to one end of a flexible shaft 40 whose opposite end is connected to the screw jack 17. By the arrangement described it will be seen that either operation of the motor 27 or turning of the throttle grip on the pitch lever will serve to rotate the shaft 40 to extend or contact the jack 17.

As shown in Figure 5 the link 17 comprises outer and inner telescoping casing sections 46 and 47, pivoted respectively to levers 16 and 15, and the section 46 journalling a screw 48 which is secured to the end of flexible shaft 40. Threaded to the screw and slidable, but non-rotatable, in the casing section 47 is a tubular member 49. A spring 51 compressed between annular flanges at the ends of members 47 and 49 causes these members to normally move as a unit relative to section 46 to shorten or lengthen the link 17 as the shaft 40 and screw 48 are rotated. Also when the shaft and screw are stationary the spring 51 normally causes the link 17 to function as a rigid unit in transmitting motion from lever 15 to lever 16. However the spring permits expansion of the link 17 upon the occurrence of larger movements of lever 15 than those causing limit movement of lever 16 in a clockwise direction. Accordingly the pilot may move the pitch lever to increase the rotor blade pitch angle beyond that in which the throttle valve is fully opened.

As shown in Figure 6 the pitch lever 11 may comprise a short tubular part 52 on which is rotatably mounted a tubular arm 53 with hand grip 54 and a rod 55 coaxial of the arm and rotatable with it. The arm 53 and rod 55 are connected by a plug 56 supporting an electrical contact pin 57 and having an arcuate opening through which extends a lock operating rod 58 with a thumb piece at its forward end. The rod 58 is rigid with an insulator 59 mounted on a tube 61 which is slidable and rotatable upon rod 55 in response to manual movement of rod 58. The insulating plug has guide holes for the contact pin 57 with a shallow contact 62 and a deep contact 63. Either contact may be engaged by pin 57 by appropriate turning and longitudinal movement of the insulator 59 by means of the thumb piece on rod 58.

The tube 61 and insulator 59 are urged forwardly (to the left in Figure 6), to close one of contacts 62 and 63 against the pin 57, by a light spring 64 which acts between a shoulder on tube 61 and a collar on rod 55 which supports screws 65. A heavier spring 66 urges the collar outwardly along rod 55 to move the heads of screws 65 into the restricted portions of opposed keyhole slots 67 that are formed in tubular part 52, or at least to move the screw heads against one of the end walls 67' of the keyhole slots. As shown in Figures 6 and 9 the screw heads are guided for purely longitudinal movement by elongated slots 68 in part 53.

When the rod 58 is actuated to depress insulator 59 and then allow it to return with pin 57 against contact 62 the screw heads 65 will be held in the wide portions of the keyhole slots 67, so that the hand grip 54 and arm 53 are free to be rotated to turn the flexible shaft 44 to which they are connected, thereby manually operating the throttle by expanding or contracting the link 17. However when the pin 57 is moved into contact with contact element 63, which will be done only when the grip 54 is turned to the correct position to align the screw heads 65 with the restricted portions of the keyhole slots, the spring 66 will urge the screw heads into that portion of the slots and thereby lock the manual throttle control against movement.

Reference will now be made to the electrical means employed in the system. In addition to motor 27, switch contacts 57, 62 and 63, the electrical means include a battery 69 or other source of electrical energy, a switch 79 operated by the governor to signal overspeed or underspeed of the rotor shaft, switches 72 and 73 associated with the extensible and contractable linkage to cut off the motor when either limit condition of the linkage is reached, and switch means comprising two switches 75 and 76 and an actuator 74 therefore operated by the motor to adjust the system for manual or automatic operation. As shown in Figure 10, the electrical circuit may also include a starter motor 70 for the engine, a solenoid switch 71 for the starter motor, a manually operated switch 80 for the starter circuit, and wires 160 to 176, inclusive, which serve to connect the various switches, motors and energy source. These wires, other than those involved in the starter circuit, are also shown in Figure 4.

As shown in Figure 4 the switch 72 is mounted on plate 18 and is adapted to be engaged and opened by bell-crank lever 16 when the latter is moved to its limit position corresponding to full open throttle and similarly the switch 73, also mounted on plate 18, is adapted to be opened by the bell-crank in its limit position corresponding to the idling or closed position of the throttle. The motor 27 through a suitable reduction gearing operates the switch actuator 74 which in its limit of the counterclockwise (as viewed in Figure 4) movement engages each of two switches 75 and 76, opening the switch 75 which is normally closed and closing the switch 76 which is normally open. The motor may be of any suitable reversing type, but in the simplified wiring diagram, Figure 10, comprises one field winding 77 which is engaged for operation in a direction to contract the screw jack 17 i. e. to open the throttle, and another field winding 78 for reverse motor operation to expand the jack and close the throttle. The governor exerts its control by movement of switch 79 which is open when the rotor drive is on speed, is closed against its lower contact when the drive is overspeed and is closed against its upper contact when the drive is underspeed.

With the switch contacts 57, 63 closed and the manual throttle control locked, the governor will operate to automatically maintain rotor speed at the value selected by manual setting of handle 41. In this automatic control action, current from the battery 69 will pass through the ground and contacts 57, 63 to the governor operated switch 79. If the rotor speed is within the "on speed" range, the switch 79 will be open so that no operation of motor 27 can occur, but for an underspeed condition the switch 79 will close against its upper contact so that the current will pass through closed switch 72 and the motor field windings 77, the motor armature and return to the battery, thereby causing motor operation in a direction to contract jack 17 and further open the throttle. This operation will continue until such time as the governor signals an on speed condition of the rotor by opening the motor circuit at switch 79. Similarly if an overspeed signal is given by the governor switch 79 closing against its lower contact, the current will pass through closed switch 73, normally closed switch 75 and the motor field armature 78. This will result in the motor operating in a direction to expand the jack 17 and close the throttle.

It will be understood that if during throttle opening movement of the motor (field coil 77 energized) the open throttle limit position of bell-crank 16 is reached, the latter will engage and open switch 72 to cut off energy to the motor. Similarly if during reverse movement of the motor the closed throttle limit is reached, the bell-crank will open switch 73 to de-energize the motor circuit.

If the manual throttle control is now unlocked and contacts 57 and 62 are closed by manipulation of control rod 58, the motor will operate the jack 17 to the correct position for manual operation and will then automatically become inoperative. Current passing from the battery through the ground, the normally closed contact 75 and the field winding 78, cause operation of the motor to fully extend the jack 17, this being the jack position chosen for manual throttle operation. When the motor has turned a number of revolutions sufficient to bring the jack to this condition if the manual throttle grip is also in closed position, the switch actuator 74 will have moved to its limit of counterclockwise motion to a position wherein the normally closed switch 75 is opened and the normally open switch 76 is closed. Consequently all energy to the motor 27 is cut off and the jack 17 will now be operable only as a result of manual twisting of throttle grip 54 on the pitch lever. It will be noted that only when the system is set for manual operation of the throttle can the circuit for the engine starter motor 70 be energized. When on automatic or governor operation the circuit for solenoid switch 71 is open at switch 76.

It will be understood that when the system is set for automatic operation the governor normally need make only relatively small or fine adjustments, coarse adjustments being made by the mechanical linkage connection between the pitch lever and the engine power or throttle control. Consequently the governor may be of a type responsive to minor speed fluctuations which greatly increases its accuracy in maintaining the selected speed. Nevertheless since a governor can respond only to off speed conditions of the rotor drive and will continue to take correcting action until the set speed is reached, the result will ordinarily be a continued alternation of overspeed and underspeed conditions known as hunting. Various means may be employed to reduce this effect, the particular means, known as feedback, employed in the presently illustrated embodiments operating by changing the control speed setting of the governor in the direction opposite to the direction of the speed correction being made. Thus if the rotor is overspeed so that the governor is causing the motor 27 to operate in throttle-closing direction, the governor speed setting is proportionately increased through gearing 34, 36, 38, flexible shaft 29, and screw jack 31. Or, if the motor is operating to increase throttle in response to an underspeed signal from the governor, the governor speed setting is reduced by the feedback system. Various amounts of feedback may of course be used, but it has been found that a change of the governor speed setting of approximately 3%, for a movement of the motor 27 sufficient to move the throttle from full open to full closed, provides a satisfactory result.

The system illustrated in Figure 11 is similar in principle to that hereinbefore described and if desired may employ similar electrical operating circuits and protective arrangements. It differs primarily in that differential lever arrangements and flexible sliding wires with flexible sheathes are employed instead of a differential gearing arrangements and flexible shafts shown in Figure 4. In Figure 11 a pitch lever 81 is connected to a pitch change rock shaft 82 and has a rotatable throttle grip 83 which through a crank 84 can impart motion to flexible sliding wire 85. The latter is supported in a flexible casing or sheath that is anchored at its ends to the lever 81 and to a fixed part 86 of the helicopter. A lever 87 on the rock shaft is pivotally connected by a link 88 to a bell-crank lever 89 having its fulcrum upon fixed structure and arranged to transmit motion to a flexible sliding wire 91 which is attached at 92 to the flexible case 93 of another flexible sliding wire 94. Wires 85, 94 and also the free end of a screw-jack 95 are pivotally connected to a lever 96.

The wire 94 is connected by a pivoted link 90 to a member 97 which is pivoted to fixed structure at 99 and has a cam slot 98 that is similar in purpose to the cam slot 21 previously described. A pin 101 having a roller in slot 98 is carried by a link 102 which is guided by rollers 103 and also by the control arm 104 of the engine throttle, indicated at 105.

The screw jack 95 which is pivoted to fixed structure at 107 is adapted to be extended or contracted by operation of a motor 106 which is connected to the jack by suitable reduction gearing 108 and flexible shaft 109. Expanding or contracting motions of the jack are transmitted through a flexible sliding wire 111 to a lever 112 which is connected by another flexible slide wire 113 to a manually operable governor speed set lever 114. Intermediate of the connections to wires 111 and 113 the lever 112 is pivoted to a link 115 which is also pivoted to an arm 116. This arm extends from a governor 117 and is angularly movable upon movement of either wire 111 or 113 to change the control speed of the governor. The latter may be driven through a flexible shaft 118 or other suitable drive means from the helicopter engine (not shown).

The governor may control the motor 106 if desired by an operating circuit arrangement generally similar to that described in connection with the apparatus shown in Figure 4, as will be readily understood by one skilled in the art.

It will be understood that in operation of the system shown in Figure 11 major or coarse adjustments of throttle position or engine power will be made by movements of lever 81 to vary the rotor blade pitch. In this action the end of slide wire 94 and its flexible sheath 93 adjacent the cam member 97 will be moved as a unit without any movement of the wire within the sheath or any movement of the lever 96. Assuming first that the throttle grip is locked, or in any event is not turned, fine adjustments of the throttle will be made by expansion or contraction of the jack by the motor as the result of overspeed or underspeed signals of the governor 117. The control speed of the governor may be varied manually by operation of lever 114, and it may be varied by feedback through flexible slide wire 111. Such feedback may be approximately at the same rate and accomplish the same purpose on the feedback described in connection with the apparatus shown in Figure 4.

With the governor and motor shut off and the throttle grip 83 freed for manual operation, the pivot between the screw jack 95 and lever 96 may act as the lever fulcrum. Turning of the throttle grip, translated into linear movement of wire 85 by the crank 84, will therefore result in movement of the unit 94 in sheath 93 to change the effective length of the linkage between the pitch lever and throttle, and to thereby make fine adjustments of the latter.

In the arrangement of Figure 11 the kinematics of the linkage between the pitch lever and throttle are preferably such that expansion or contraction respectively will cause the pitch versus throttle relationship to change to that approximately correct for a lower speed or for a higher speed, or, in other words, to change from approximate adherence to one curve in Figure 3 to the curve therein for a lower or higher speed. In this way a change in the governor speed setting, by moving lever 114, will result in the mechanical linkage being adapted to the new speed setting.

Figure 12:
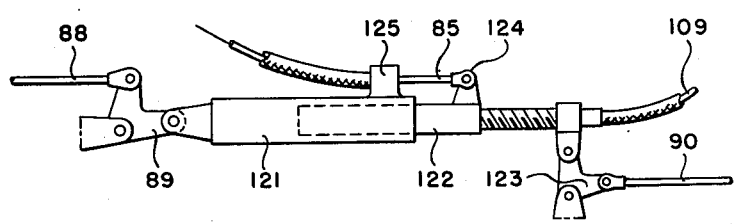

There is illustrated in Figure 12 a modified linkage which may be employed, for example, between the bell-crank 89 and the cam link 90 of the structure shown in Figure 11 to replace the flexible wires 91 and 94, jack 95 and lever 96. Pivoted to bell-crank 89 is a tubular casing 121 in which is slidably mounted the body of a screw jack 122. The opposite end of the jack is pivoted to one arm of a bell-crank 123 which has a fixed fulcrum and has its remaining arm pivoted to the link 90. The jack may be extended or contracted through rotation of the flexible shaft 109 by the motor drive means hereinbefore described. The flexible slide wire 85 for effecting manual throttle adjustment is connected at 124 to the jack body, while its flexible sheath is connected at 125 to the casing 121. As will be apparent, extension or contraction of the linkage between elements 89 and 90 may be effected with this arrangement either manually or automatically by the governor controlled motor driven jack, to produce in another way substantially the same result attained with the apparatus shown in Figure 11.

It will be understood that the linkage between the pitch lever and throttle or other power control may be altered in various ways, and also that various electrical and other types of means responsive to rotor speed may be employed to effect the finer adjustments of the linkage contemplated by the invention to be superimposed upon the coarse adjustments made by mechanical linkage. For example it may be considered in Figure 11 that the motor 106 is hydraulically operated and that the governor 117 is a governor valve for controlling the motor; or, to effect essentially the same result, the motor 106 and screwjack 95 may be replaced by a hydraulic strut or jack controlled by such a governor valve. These and various other modifications which will readily occur to one skilled in the art may be made without departing from the spirit of the invention or from the scope of the appended claims.

We claim:

1. In a helicopter having a power control and a manually operable rotor pitch control, the combination therewith of an adjustable linkage for coordinating said controls to cause the power control setting to correspond approximately with the setting required to maintain constant rotor speed at various rotor blade pitch positions, a drive speed responsive means and means controlled thereby for adjusting said linkage to more closely maintain constant rotor speed, a manually operable element for adjusting said linkage, means for rendering said element inoperative, and means for rendering said element operative and for simultaneously disconnecting said speed responsive means from the means controlled thereby, said last-mentioned means including means for causing readjustment of said linkage to a predetermined condition for manual control.

2. In a helicopter having a rotor drive power control and a manually operable rotor pitch control, the combination therewith of an adjustable linkage for coordinating said controls to cause the power setting to correspond approximately with the setting required to maintain constant rotor speed at the various rotor blade pitch positions, a drive speed responsive means and power operated means controlled thereby for adjusting said linkage to more closely maintain constant rotor speed, a manually operable element for adjusting said linkage, means for rendering said element inoperative, and means for rendering said element operative and for simultaneously rendering ineffective the control of said power operated means by said speed responsive means, said last-mentioned means including means for causing operation of said power operated means to adjust the linkage to a predetermined condition for manual control.

3. In a helicopter having a rotor drive power control operable between predetermined limits and a manually operable rotor pitch control, the combination therewith of an adjustable linkage for coordinating said controls to cause the power setting to correspond approximately with the setting required to maintain constant rotor speed at the various rotor blade pitch positions, a drive speed responsive means and power operated means controlled thereby for adjusting said linkage to more closely maintain constant rotor speed, a manually operable element for adjusting said linkage, means for rendering said element inoperative, means for rendering said element operative and for simultaneously rendering ineffective the control of said power operated means by said speed responsive means, said last-mentioned means including means for causing operation of said power operated means to adjust the linkage to a predetermined condition for manual control, and means responsive to the power control reaching either limit position thereof for rendering said power operated means inoperative.

4. In a helicopter having a rotor drive power control and a manually operable rotor pitch control member, means including a device responsive to rotor speed and operatively connected to said power control, a manual control element carried by and movable relative to said pitch control member and operatively connected to said power control, means for locking said manual control element in a predetermined position relative to said pitch control member, and means for simultaneously unlocking said manual control element and rendering the speed responsive device ineffective to operate the power control.

5. In a helicopter having a rotor drive torque control element and a rotor blade pitch control system including a pilot operable element for operating said system to vary the blade pitch, the combination therewith of an operating connection between said pitch control system and said torque control element, said operating connection including cam and cam follower means arranged to move the torque control element approximately to the setting thereof required to maintain a selected rotor speed at any of various blade pitch positions selected by operation of said pilot operable element, said operating connection including adjustable means to vary the setting of the torque control element relative to blade pitch position, means responsive to rotor drive speed and means operatively interconnecting said speed responsive means and said adjustable means to effect adjustment of the latter in response to deviations from said selected speed and in a direction to maintain said selected speed.

6. In a helicopter having a rotor drive torque control element and a rotor blade pitch control system, the combination therewith of an operating connection between said pitch control system and said torque control element, said operating connection including variable ratio means arranged to move the torque control element approximately to the setting thereof required to maintain a selected rotor speed at any of various blade pitch positions selected by said pitch control system, said operating connection including adjustable means to vary the setting of the torque control element relative to blade pitch position, means responsive to rotor drive speed and means operatively interconnecting said speed responsive means and said adjustable means to effect adjustment of the latter in response to deviations from said selected speed and in a direction to maintain said selected speed.

7. In a helicopter having a rotor drive torque control element and a rotor blade pitch control system, the combination therewith of an operating connection between said pitch control system and said torque control element, said operating connection including means arranged to move the torque control element approximately to the setting thereof required to maintain a selected rotor speed at any of various blade pitch positions selected by operation of pitch control system, said operating connection including adjustable means to vary the setting of the torque control element relative to blade pitch position, a governor responsive to changes in rotor drive speed, and means controlled by said governor and operatively connected to said adjustable means for effecting adjustment thereof in response to deviations from said selected speed and in a direction to maintain said selected speed.

8. In a helicopter having a rotor drive torque control element and a rotor blade pitch control system including a pilot operable element for operating said system to vary the blade pitch, the combination therewith of an operating connection between said pitch control system and said torque control element, said operating connection including means arranged to move the torque control element approximately to the setting thereof required to maintain a selected rotor speed at any of various blade pitch positions selected by operation of said pilot operable element, said operating connection including adjustable means to vary the setting of the torque control element relative to blade pitch position, a governor responsive to changes in rotor drive speed, and means controlled by said governor and operatively connected to said adjustable means for effecting adjustment thereof in response to deviations from said selected speed and in a direction to maintain said selected speed.

9. In a helicopter having a rotor drive torque control element and a rotor blade pitch control system including a pilot operable element for operating said system to vary the blade pitch, the combination therewith of an operating connection between said pitch control system and said torque control element, said operating connection including means arranged to move the torque control element approximately to the setting thereof required to maintain a selected rotor speed at any of various blade pitch positions selected by operation of said pilot operable element, said operating connection including adjustable means to vary the setting of the torque control element relative to blade pitch position, means responsive to rotor drive speed operatively connected to said adjustable means to effect adjustment thereof in response to deviations from said selected speed, and manually operable means also operatively connected to said adjustable means for adjustment thereof.

10. In a helicopter having a rotor drive torque control element and a rotor blade pitch control system including a pilot operable element for operating said system to vary the blade pitch, the combination therewith of an operating connection between said pitch control system and said torque control element, said operating connection including means arranged to move the torque control element approximately to the setting thereof required to maintain a selected rotor speed at any of various blade pitch positions selected by operation of said pilot operable element, said operating connection including adjustable means to vary the setting of the torque control element relative to blade pitch position, means responsive to rotor drive speed for actuating said adjustable means to thereby superimpose a speed responsive control upon the drive torque control provided by said operating connection, manually operable means for actuating said adjustable means, and a differential connection between said speed responsive means, said manually operable means and said adjustable means whereby either the manually operable means or the speed responsive means may actuate said adjustable means.

11. In a helicopter having a rotor drive torque control element and a rotor blade pitch control system, the combination therewith of an operating connection between said pitch control system and said torque control element, said operating connection including cam and cam follower means arranged to move the torque control element approximately to the setting thereof required to maintain a selected rotor speed at any of various blade pitch positions selected by operation of said pitch control system, said operating connection including adjustable means to vary the setting of the torque control element relative to blade pitch position, a governor responsive to changes in rotor drive speed, means controlled by said governor and operatively connected to said adjustable means for effecting adjustment thereof, manually operable means also operatively connected to said adjustable means, and selecting means for rendering either said governor-controlled means or said manually operable means operable to actuate said adjustable means and for simultaneously rendering the other thereof inoperable.

12. In a helicopter having a rotor drive torque control element operable between predetermined limits and a rotor blade pitch control system including a pilot operable element for operating said system to vary the blade pitch, the combination therewith of an operating connection between said pitch control system and said torque control element, said operating connection including means arranged to move the torque control element approximately to the setting thereof required to maintain a selected rotor speed at any of various blade pitch positions selected by operation of said pilot operable element, said operating connection including a resiliently preloaded play connection to allow the pitch control element to overtravel the torque control element when the latter reaches a limit position thereof, said operating connection including adjustable means to vary the setting of the torque control element relative to blade pitch position, and means responsive to rotor drive speed operatively connected to said adjustable means for effecting adjustment thereof.

13. In a helicopter having a rotor drive torque control element operable between predetermined limits and a rotor blade pitch control system including a pilot operable element for operating said system to vary the blade pitch, the combination therewith of an operating connection between said pitch control system and said torque control element, said operating connection including means arranged to move the torque control element approximately to the setting thereof required to maintain a selected rotor speed at any of various blade pitch positions selected by operation of said pilot operable element, said operating connection including a resiliently preloaded play connection to allow the pitch control element to overtravel the torque control element when the latter reaches a limit position thereof, said operating connection including adjustable means to vary the setting of the torque control element relative to blade pitch position, means responsive to rotor drive speed operatively connected to said adjustable means to effect adjustment thereof, manually operable means also operatively connected to said adjustable means, and selector means for rendering either said speed responsive means or said manually operable means inoperative and simultaneously rendering the other one thereof operative to actuate said adjustable means.

14. In a helicopter having a manually operable rotor pitch control and a power control, an adjustable linkage connecting said controls, a governor and means normally connected to and controlled by said governor and connected to said linkage for effecting adjustment thereof, a manually operable element operatively connected to said linkage for effecting adjustment thereof, means for selectively rendering said element inoperative or simultaneously rendering said element operative and disconnecting said governor from said governor-controlled means, said last-mentioned means including means for causing said governor-controlled means in response to said disconnecting operation, to adjust said linkage to a predetermined condition.

15. In a helicopter having a drive power control and a rotor pitch control; the combination therewith of adjustable means connecting said controls for effecting coordinated increase or decrease of drive power with increase or decrease, respectively, of rotor pitch; drive speed responsive governor means adjustable as to control speed setting and operatively connected to said adjustable connecting means for effecting an increase or decrease of drive power in response to a deviation of the drive speed, under or over, respectively, from the set control speed; and means connected to and actuated by said governor means to effect an increase or decrease of the set control speed in response to a deviation of the drive speed, over or under, respectively, from the set control speed.

ALLEN F. DONOVAN.
HAROLD HIRSCH.

REFERENCES CITED

The following references are of record in the file of this patent:

UNITED STATES PATENTS

| Number | Name | Date |
|---|---|---|
| 2,115,485 | Dodson | Apr. 26, 1938 |
| 2,209,879 | Focke | July 30, 1940 |
| 2,217,364 | Halford et al. | Oct. 8, 1940 |
| 2,317,341 | Bennett | Apr. 27, 1943 |
| 2,318,260 | Sikorsky | May 4, 1943 |
| 2,343,378 | Kieser | Mar. 7, 1944 |
| 2,364,116 | Whitehead | Dec. 5, 1944 |
| 2,378,558 | Kalin | June 19, 1945 |
| 2,399,685 | McCoy | May 7, 1946 |
| 2,517,150 | Webb | Aug. 1, 1950 |